United States Patent Office 3,546,061

Patented Dec. 8, 1970

3,546,061

MOLDED BUILDING BLOCKS OF DIFFERENT FOAMED GLASS LAYERS AND PROCESS FOR MAKING SAME

Stefan Kraemer, Essen, and Alois Seidl, Post Lam, Lower Bavaria, Germany, assignors to Wasag-Chemie Aktiengesellschaft, Essen, Germany No Drawing. Filed Mar. 11, 1968, Ser. No. 711,896
Claims priority, application Germany, Mar. 11, 1967, W 43,539
Int. Cl. B32b 3/26
U.S. Cl. 161—159 5 Claims

ABSTRACT OF THE DISCLOSURE

A molded building block resulting from heating to 700–900° C. stratified layers of about 90–10% (preferably 80%) powdered glass, the major constituent of which glass consists of either boron oxide or lead oxide, containing a foaming agent and about 10–90% by weight (preferably 20%) of a granular powdered siliceous material produced by dissolving about 0.02–0.7 parts by weight of a fibrous silicate in 1 part by weight of aqueous alkali silicate solution and then drying and granulating the same. The block is molded by introducing the foamable mixture into molds or onto travelling belts which are then moved through an oven.

CROSS REFERENCES TO RELATED APPLICATIONS

Applicants claim priority under 35 U.S.C. 119 for application Ser. No. W 43,539, filed in the Patent Office of the Federal Republic of Germany on March 11, 1967.

Reference is made to the copending applications of Seidl et al. entitled "Ceramic Granular Fillers, Process of Producing and Articles Molded Therefrom," having Ser. No. 534,431 and a filing date of March 15, 1966 (now abandoned), and that of Kraemer et al. entitled "Apparatus and Process for the Continuous Production of Foamed Glass and Foamed Ceramic," having Ser. No. 570,542 and a filing date of Aug. 5, 1966 which issued Oct. 21, 1969 as U.S. Pat. 3,473,904.

BACKGROUND OF THE INVENTION

The field of the invention is non-metallic article shaping or treating wherein pores are formed in situ during vitrification or firing.

The state of the prior art is fully set forth in U.S. Pats. 2,303,885; 3,184,371; 3,261,894; 3,331,694; and the section on "Glass" in the Kirk-Othmer Encyclopedia of Chemical Technology, 2nd ed., vol. 10 (1966), pages 533–603. The prior art methods of molding foamed glass and foamed ceramic are set forth in U.S. Pat. 2,303,885 and the methods of producing the granular powdered silicate starting material used in the present invention are fully disclosed in the U.S. Pats. 3,184,371 and 3,261,894 of Alois Seidl.

Claim 1 of U.S. Pat. 3,184,371 discloses the preparation of an intermediate product by forming a first mixture containing in parts by weight about 1 part alkali metal silicate, 0.02 to 0.7 part of inorganic fibrous silicate, and 2 to 10 parts of water; heating the mixture to about 140–360° C., and crushing the heated mixture to obtain particles of 0.1 to 10 mm.

According to the prior art, gas impermeable molded bodies are produced by foaming very finely powdered glass to which suitable gas-producing substances have been added. These molded bodies and methods of making are fully set forth in U.S. Pat. 3,331,694 and the prior German patent corresponding thereto. An important disadvantage of these prior art molded bodies for use in building construction is that they do not adhere to inorganic binders such as gypsum, lime, lime mortar, cement mortar, etc., but require an intermediate layer.

SUMMARY OF THE INVENTION

Having in mind the limitations of the prior art wherein molded building blocks of foamed glass had poor adhesion to mortar, it is an object of the present invention to provide molded building blocks of foamed glass that have excellent adhesion to all binding materials that are commonly used for building construction.

According to the present invention, the molded building blocks are formed by heating a stratified mixture of a powdered glass containing a foaming agent and a granular or powdered siliceous material to 700–900° C. The powdered siliceous material is produced by dissolving about 0.02–0.7 part by weight of a fibrous silicate in 1 part by weight aqueous alkali silicate solution and then drying and granulating the same. The molding is carried out by introducing the foamable mixture into molds or upon travelling belts which are then moved through an oven. By suitably arranging the layers, a unitary body is produced which has very good mechanical properties, is impervious to gases and at the same time adheres readily to binders. The thickness and foaming characteristics of each layer are variable within wide limits. The amount of powdered glass is normally kept between about 90–10% by weight and the amount of the granular silicate is held between 10 and 90% by weight. For the preferred use in building construction, it has been found advantageous to use a building block consisting of 80% by weight foamed glass and 20% by weight foamed silicate material.

The method of producing the granular or powdered silicate products is fully disclosed in U.S. Pat. 3,184,371 and the method of producing the powdered glass containing the foaming agent is set forth in U.S. Pat. 3,331,694.

DESCRIPTION OF THE PREFERRED EMBODIMENTS

The compositions of the two foamable starting materials are chosen so that the foaming temperatures and the cooling curves are about coextensive. For example, the melting point of the powdered glass can be lowered by the use of suitable kinds of glass, or by the addition of lead oxide or other known glass components. By the addition of borax or other oxides such as zinc oxide, calcium oxide or the like, the expansion curve can be adjusted. It is of utmost importance that of the two components foam at the same temperature in order to obtain a condition of uniform porosity. In this manner it is possible to avoid internal stresses during cooling which could produce fissures in the resulting products.

In addition to the method of producing foamed building blocks with a different sequence of layers of the two components (alternating multiple layers) there is also the embodiment of using the surface layers as disclosed in U.S. Pat. 3,184,371. It is particularly advantageous to provide the foamed silicate layer with a hard sintered outer layer of powdered sand and glass.

In a further embodiment of the present invention, powdered glass is substituted by a very finely ground material produced as described in U.S. Pat. 3,184,371 with the addition of a foaming agent, the resulting product is likewise impermeable to gases.

The foamed glass building blocks are advantageously produced by depositing the components on a travelling belt. The powdered glass is first deposited as a layer of uniform thickness and then the granular or powdered silicate material is deposited thereon. After the layers reach the foaming temperature, the foamed glass building block is subjected to increased pressure and is then gradually cooled to room temperature. The foamed glass block thus obtained has a density for example between 0.10 and 0.15 g./cm.$^3$.

The glass compositions suitable for use in the present invention are illustrated in Kirk-Othmer, ib., vol. 10 (1966) particularly pages 542–545. For example, Table 4 on page 544 discloses glass compositions which consist as their major constituent of either boron oxide, $B_2O_3$, or lead oxide, PbO.

Non-limiting examples of the foaming agents illustrative of the present invention are carbon black or lamp black, in combination with decomposable sulfates, as for example zinc sulfate and aluminum sulfate and also carbonates such as calcium carbonate.

Typical examples of glass suitable in the present invention are:

| | Percent by wt., about |
|---|---|
| Window Glass: | |
| $SiO_2$ | 71–73 |
| $Na_2O$ | 13–15 |
| CaO | 9–10 |
| Plate or mirrorglass: | |
| $SiO_2$ | 72 |
| $Na_2O$ | 13 |
| CaO | 14 |

Without further elaboration, it is believed that one skilled in the art can, using the preceding description, utilize the present invention to its fullest extent. The following preferred specific embodiments are, therefore, to be construed as merely illustrative, and not limitative, of the remainder of the specification and claims in any way whatsoever.

EXAMPLE 1

A finely ground mixture is produced for 92% by weight of powdered glass (of flat glass composition) with a granular size of 12,000 mesh DIN (German Industrial Standard), 1% arsenic trioxide (for bettter foaming), 3% carbon and 4% aluminum sulfate.

150 g. of rock wool are then dissolved completely by heating and stirring with 2 liters of aqueous alkali silicate solution (containing 310 g. of the dry substance) and the solution is then concentrated by evaporating it down in an iron kettle. After cooling, the solid residue is broken up and comminuted in a hammer mill to a grain size of about 0.5–1 mm.

A metallic mold which has been coated internally with a slip is first filled to a height of 8 mm. with the abovementioned powdered glass mixture (80% by weight), under which 20% by weight of the granulated silicate materials are filled in to a height of 2 mm. The mold and its contents are then heated 15 minutes to 800° C. and then slowly cooled during a period of 2 hours. A molded body having good insulation properties is obtained. The solid material has a density of 0.14 g./cm.$^3$. This building block measuring 45 x 30 cm. is laid in cement mortar with good adhesion.

Although it has been known that foamed glass building blocks could be produced by depositing different layers of foamed glass having different properties upon one another, it was nevertheless surprising that according to the present invention it was possible to produce mechanically satisfactory building blocks having many advantages disclosed.

EXAMPLE 2

5 kg. of finely powdered waste material of foamed glass (granule size 6000 mesh) prepared according to U.S. Pat. 3,184,371 are triturated and thoroughly mixed with 10 g. lampblack and 12 g. zinc sulfate. This powder is filled to a height of 10 mm. into a metallic mold measuring 50 x 50 x 10 cm. which is coated internally with a calcium carbonate slip. The mold is then heated 25 minutes to 750° C. and allowed to cool slowly for 10 hours. A gas-impervious molded body is obtained which has the insulating properties that are characteristics of foamed glass.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A method for the production of gas impervious foamed glass building blocks with good adhesion to mortar, comprising:
   (a) forming a first mixture consisting in parts by weight of about 1 part alkali metal silicate, 0.02 to 0.7 part of inorganic fibrous silicate and 2 to 10 parts of water;
   (b) heating said first mixture to about 140–360° C.;
   (c) crushing said heated mixture to obtain an intermediate product;
   (d) mixing a foaming agent with powdered glass, the major constituent of said glass being selected from the group consisting of boron oxide and lead oxide, to form a second mixture;
   (e) depositing said intermediate product and said second mixture in alternating layers in means for molding; and
   (f) heating the deposited layers at a temperature of about 700–900° C. to form said gas impervious foamed glass building blocks consisting of foamed layers with good adhesion to mortar.

2. The method of claim 1, wherein said intermediate product (c) is about 10–90 percent by weight and said second mixture (d) is about 90–10 percent by weight of the material deposited in said means for molding.

3. The method of claim 1, wherein said intermediate product (c) is about 20 percent by weight and said second mixture (d) is about 80 percent by weight.

4. The method of claim 2, wherein said intermediate product (c) and said second mixture (d) are deposited in alternating multiple layers.

5. The product obtained by the method of claim 1 having a density of about 0.10 to 0.15 grams/cm.$^3$.

References Cited

UNITED STATES PATENTS

| | | | |
|---|---|---|---|
| 2,303,885 | 12/1942 | Miller | 65—22 |
| 3,184,371 | 5/1965 | Seidl | 161—193 |
| 3,261,894 | 7/1966 | Seidl | 264—43 |
| 3,331,694 | 7/1967 | Heidrich | 106—40 |

OTHER REFERENCES

Kirk-Othmer, vol. 10, pp. 542–545 (1966).

S. LEON BASHORE, Primary Examiner

E. R. FREEDMAN, Assistant Examiner

U.S. Cl. X.R.

65—22, 144; 161—193; 264—43